(12) United States Patent
Bastanipour et al.

(10) Patent No.: US 10,823,092 B2
(45) Date of Patent: Nov. 3, 2020

(54) SYSTEM AND METHOD FOR WASTE-GATE VALVE DIAGNOSTICS

(71) Applicant: Ford Global Technologies, LLC, Dearborn, MI (US)

(72) Inventors: Michael Bastanipour, Ferndale, MI (US); Nicholas Herhusky, Dearborn, MI (US); Timothy Stolzenfeld, Livonia, MI (US); Baitao Xiao, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/256,774

(22) Filed: Jan. 24, 2019

(65) Prior Publication Data
US 2020/0240334 A1 Jul. 30, 2020

(51) Int. Cl.
*F02D 41/00* (2006.01)
*F02B 37/18* (2006.01)
*F02D 23/00* (2006.01)
*F02D 41/22* (2006.01)
*F02B 37/16* (2006.01)

(52) U.S. Cl.
CPC ........ *F02D 41/0007* (2013.01); *F02B 37/186* (2013.01); *F02D 23/00* (2013.01); *F02D 41/22* (2013.01); *F02B 37/162* (2019.05); *F02D 2200/501* (2013.01)

(58) Field of Classification Search
CPC ...... F02D 41/0007; F02D 23/00; F02D 41/22; F02D 2200/501; F02B 37/186; F02B 37/162

USPC .............. 60/600, 602, 605.2, 607, 608, 611; 123/559.1, 564
See application file for complete search history.

(56) References Cited

U.S. PATENT DOCUMENTS

| 6,705,084 | B2 | 3/2004 | Allen et al. |
| 8,096,125 | B2* | 1/2012 | Hepburn ................. F01N 3/021 60/605.2 |
| 8,220,245 | B1* | 7/2012 | Papandreas ............... F02C 3/10 60/39.163 |
| 8,849,548 | B2 | 9/2014 | Luft et al. |
| 9,109,504 | B2 | 8/2015 | Wang et al. |
| 9,890,125 | B2* | 2/2018 | Nolan ................ C07D 295/096 |
| 2015/0184587 | A1* | 7/2015 | Komiya ................. F02M 26/06 123/568.21 |
| 2017/0335755 | A1* | 11/2017 | Xiao ....................... F02B 37/04 |

FOREIGN PATENT DOCUMENTS

KR 101552061 B1 9/2015

* cited by examiner

*Primary Examiner* — Hoang M Nguyen
(74) *Attorney, Agent, or Firm* — Geoffrey Brumbaugh; McCoy Russell LLP

(57) ABSTRACT

Methods and systems are provided for diagnosing an exhaust waste-gate valve via an electric boost assist motor of an electric turbocharger. Degradation of the waste-gate valve is inferred based on the motor torque profile of the motor after commanding the waste-gate valve to an open or closed position on a torque transient. Deviation of the motor torque profile from the expected profile is used to infer if the valve is stuck open or closed, and actions are taken accordingly.

20 Claims, 6 Drawing Sheets

SYSTEM AND METHOD FOR WASTE-GATE VALVE DIAGNOSTICS

FIELD

The present description relates generally to methods and systems for diagnosing a waste-gate valve in a boosted engine system having an electrically assisted turbocharger.

BACKGROUND/SUMMARY

Engine systems may be configured with boosting devices, such as turbochargers or superchargers, for providing a boosted aircharge and improving peak power outputs. The use of a compressor allows a smaller displacement engine to provide as much power as a larger displacement engine, but with additional fuel economy benefits. Turbochargers, however, suffer from turbo lag. Since the compressor speed depends on the speed with which a turbine can be spooled up, during a transient increase in torque demand, there may be a lag between when the boost pressure is demanded and when it is delivered.

The transient response of the boosted engine may be improved by controlling exhaust flow through a turbocharger turbine. For example, during a tip-in when boost demand increases, a waste-gate valve coupled in an exhaust bypass may be moved to a more closed position to increase exhaust flow through the turbine. The resulting spooling up of the turbine increases turbine speed and thereby compressor output. As another example, during a tip-out when boost demand decreases, the waste-gate valve may be moved to a more open position to increase exhaust flow bypassing the turbine. The resulting spinning down of the turbine decreases turbine speed and thereby compressor output. The transient response can also be improved by configuring the turbocharger to have electric assistance. For example, an electric motor/generator may be coupled to the turbocharger shaft for adding or removing torque thereto. During a tip-in, when torque demand increases, the electric motor can add torque to the shaft to spin the compressor and meet the boost demand. During a tip-out, the motor may act as a generator to remove torque from the shaft to charge a battery while averting turbine over-speeding.

Waste-gate valves may be periodically diagnosed to ensure their functionality. One example diagnostic is shown by Luft et al. in U.S. Pat. No. 8,849,548. Therein, a sensor coupled to the waste-gate valve is used to identify if the waste-gate valve is stuck closed when commanded open.

However the inventors herein have identified potential issues with such an approach. As one example, the need for a dedicated waste-gate valve position sensor can add cost and complexity to the engine system. Additionally, the position sensor itself must also be diagnosed and, depending on its application, may be prone to warranty issues. The additional sensor also makes powertrain packaging more difficult since there is minimal space in modern engines for additional hardware.

In one example, the above issues may be addressed by a method for an engine coupled to a turbocharger, comprising: during a torque transient, commanding a change in exhaust waste-gate valve position; and indicating degradation of the waste-gate valve based on a change in electrical energy input or output by an electric boost assist motor coupled to the turbocharger. In this way, existing hardware can be advantageously leveraged for diagnosing a waste-gate valve.

As an example, a boosted engine system may include an electrically assisted turbocharger. Therein, an intake compressor may be coupled to an exhaust turbine via a shaft, a motor/generator coupled to the shaft for adding or removing torque to/from the shaft. Responsive to a drop in operator torque demand, such as following a tip-out, a controller may command an exhaust waste-gate valve open to reduce turbine speed and boost pressure. If the waste-gate valve is stuck closed when commanded open, the turbine speed may not fall, as expected to. Consequently, to provide the target drop in boost pressure, the motor/generator may draw torque from the turbocharger shaft and charge a system battery. Therefore, an increase in electric regeneration energy (and a corresponding rise in battery state of charge) during a tip-out, after commanding a waste-gate open, may be used to infer that the waste-gate valve is stuck closed.

As another example, responsive to a rise in operator torque demand, such as following a tip-in, a controller may command an exhaust waste-gate valve closed to increase turbine speed and boost pressure. If the waste-gate valve is stuck open when commanded closed, the turbine speed may not rise, as expected to. Consequently, to provide the target rise in boost pressure, the motor/generator may draw electrical power from the system battery and add torque to the turbocharger shaft. The torque added to the shaft may be higher than an amount otherwise required, as well as for a longer duration than otherwise required. Therefore, an increase in drawn electric energy (and a corresponding drop in battery state of charge) during a tip-in, after commanding a waste-gate closed, may be used to infer that the waste-gate valve is stuck open. In this way, by comparing an actual electrical energy profile of a motor/generator for an electrical turbocharger to an expected profile, an exhaust waste-gate valve may be diagnosed. The technical effect of monitoring an amount and duration of electrical energy drawn by the motor/generator on a tip-in is that excess energy draw and/or prolonged energy draw can be correlated with a slower than expected rise in turbine speed due to a degraded (stuck open) waste-gate valve. Likewise, the technical effect of monitoring an amount and duration of electrical energy regenerated by the motor/generator on a tip-out is that additional and prolonged regeneration of energy can be correlated with a slower than expected fall in turbine speed due to a degraded (stuck closed) waste-gate valve. Consequently, existing hardware can be leveraged for waste-gate diagnostics, reducing the cost and control complexity associated with the need for dedicated sensors.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
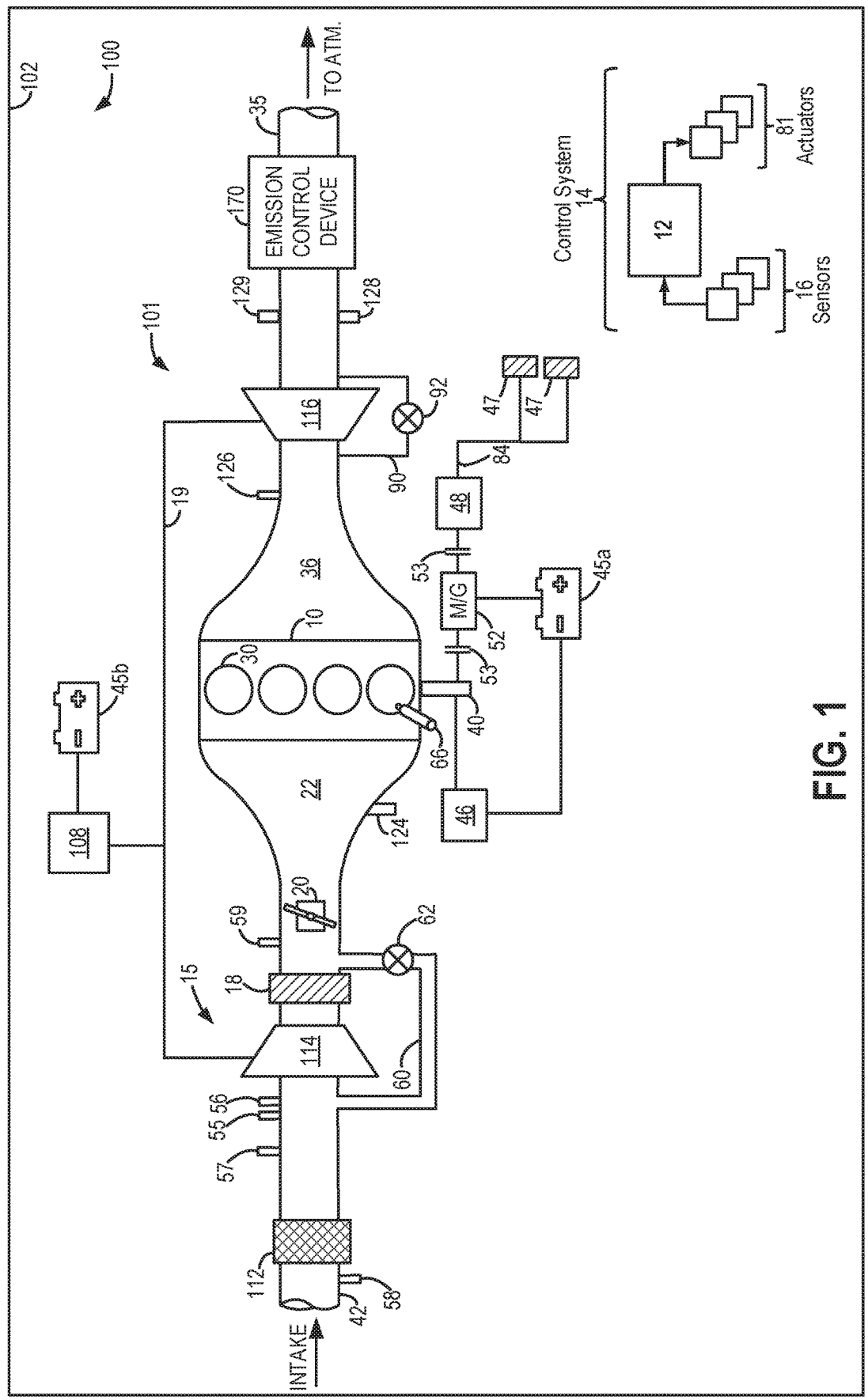
FIG. 1 shows an example embodiment of a vehicle with a boosted engine system configured with electric assistance.
Figure 3:
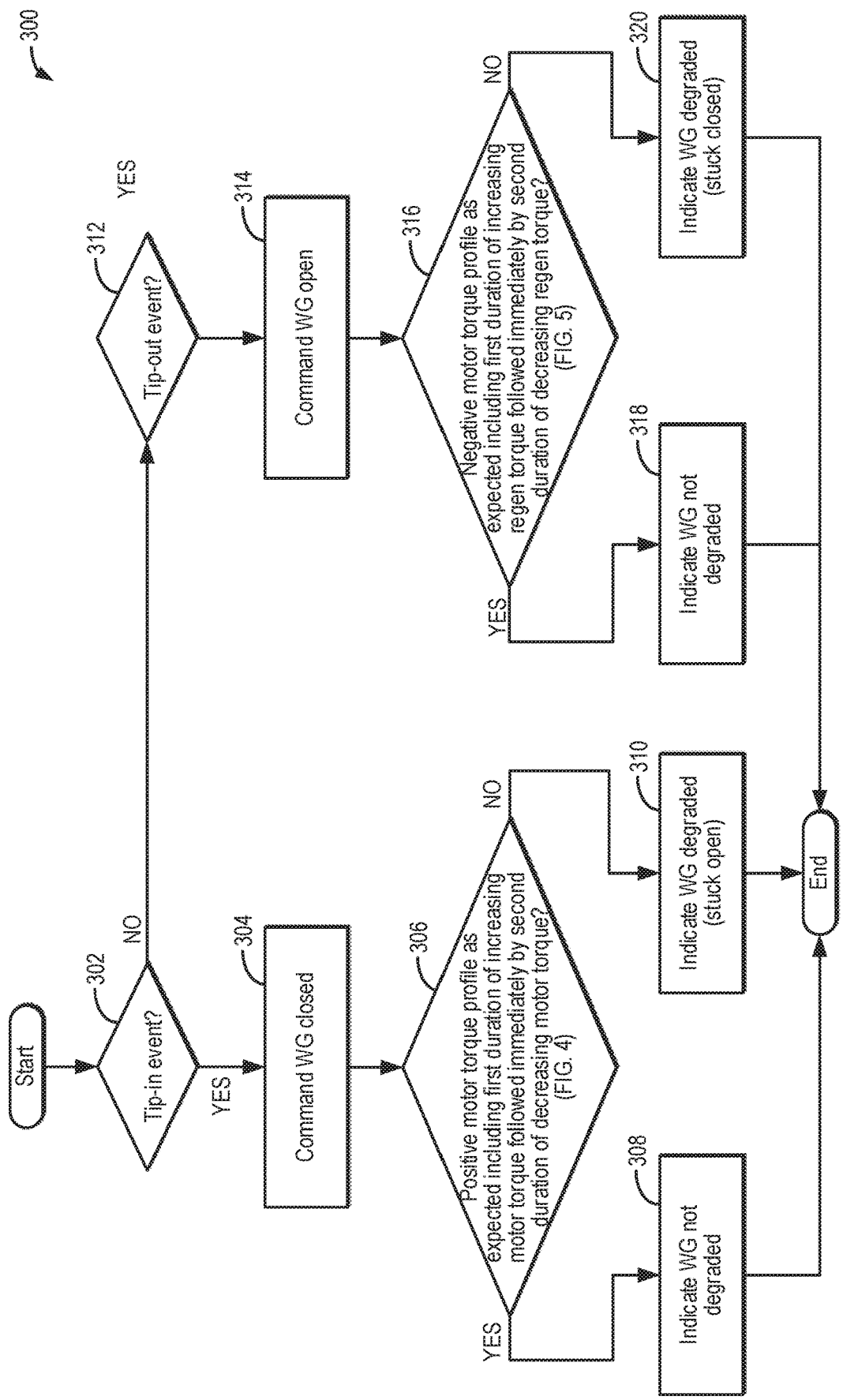
FIG. 3 shows a high level flow chart of a method for diagnosing an exhaust waste-gate valve based on a power output of an electric boost assist motor/generator.
Figure 4:
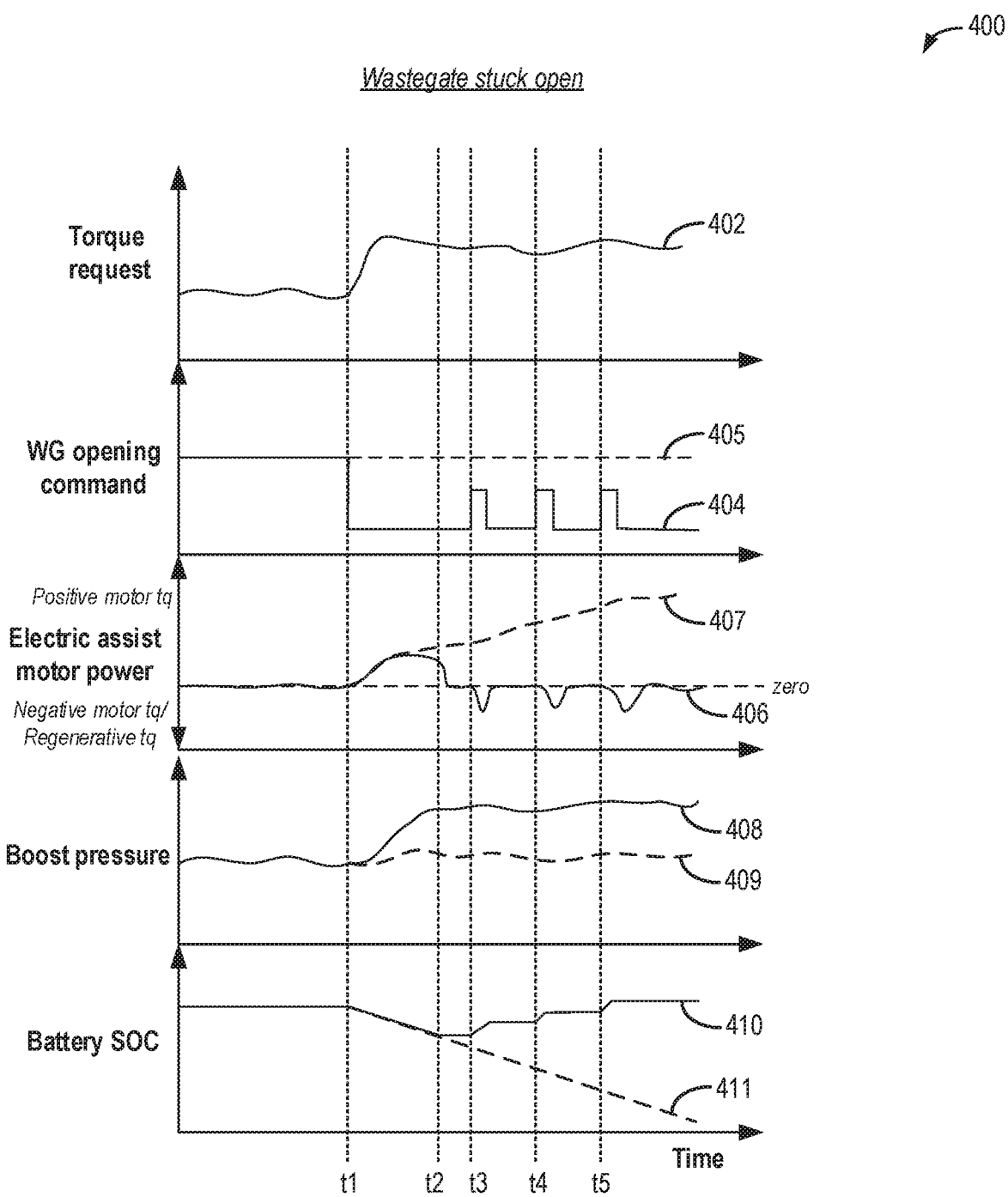
FIG. 4 compares a motor torque profile observed during a tip-in for a boosted engine system having a functional waste-gate valve to an engine system with a waste-gate valve stuck open.
Figure 5:
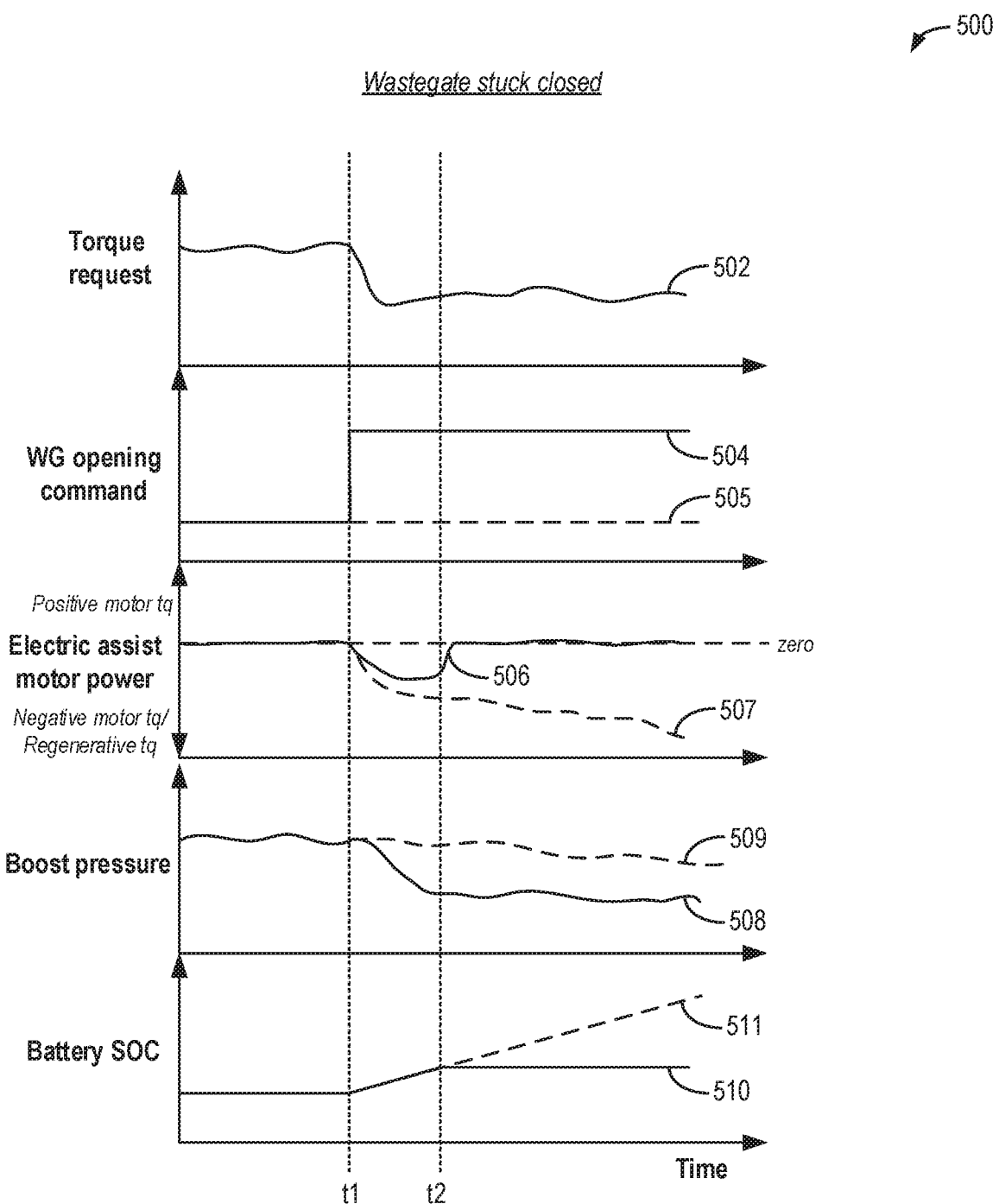
FIG. 5 compares a motor torque profile observed during a tip-out for a boosted engine system having a functional waste-gate valve to an engine system with a waste-gate valve stuck closed.
Figure 6:
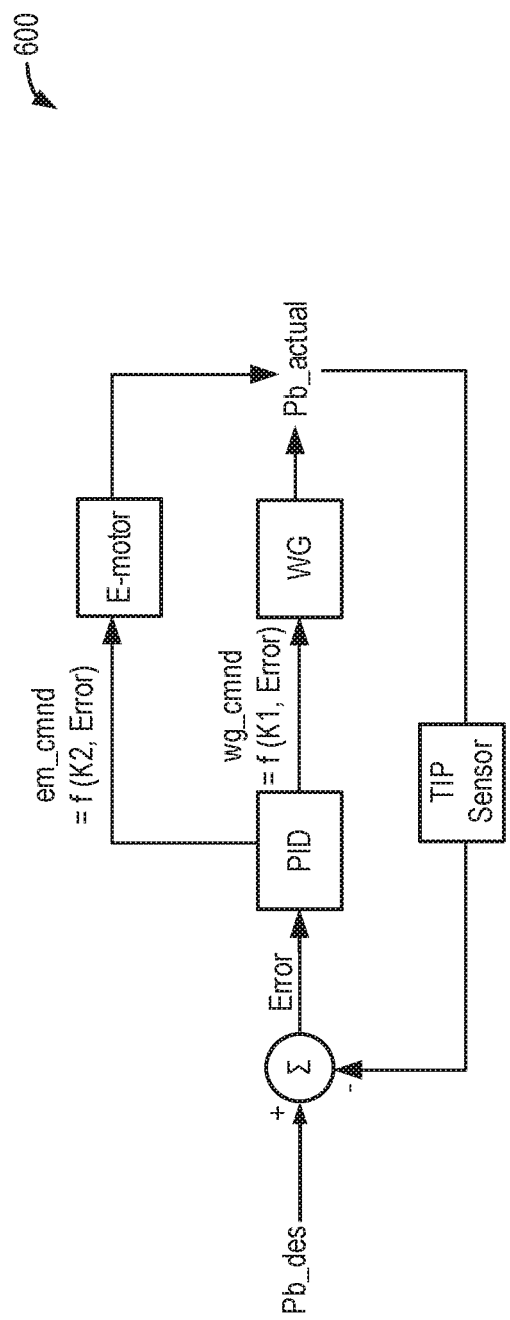
FIG. 6 shows an example waste-gate valve control loop.

The following description relates to systems and methods for diagnosing an exhaust waste-gate valve for a boosted engine system having an electric turbocharger, such as the engine system of FIG. 1. A waste-gate valve of the boosted engine system may be operated with feedback control responsive to boost pressure, as shown at FIG. 6. A controller may be configured to perform a control routine, such as the example routines of FIGS. 2-3, to diagnose the waste-gate valve during a tip-in and a tip-out by monitoring the electrical power response of an electric boost assist motor/generator. Profiles expected in the absence or presence of waste-gate valve degradation are shown at FIGS. 4-5.

FIG. 1 schematically shows aspects of an example hybrid vehicle system 100, including an engine system 101 having an engine 10 coupled in a vehicle 102. In the depicted example, vehicle 102 is a hybrid electric vehicle with multiple sources of torque available to one or more vehicle wheels 47. In the example shown, a powertrain of vehicle 102 includes engine 10 and an electric machine 52. Electric machine 52 may be a motor or a motor/generator. Engine 10 and electric machine 52 are connected to vehicle wheels 47 via a transmission 48 when one or more clutches 53 are engaged. In the depicted example, a (first) clutch 53 is provided between engine 10 and electric machine 52, and a (second) clutch 53 is provided between electric machine 52 and transmission 48. A controller 12 may send a signal to an actuator of each clutch 53 to engage or disengage the clutch, thereby connecting or disconnecting engine 10 from electric machine 52 and the components connected thereto and/or connecting or disconnecting electric machine 52 from transmission 48 and the components connected thereto. For example, torque from engine 10 may be transferred to vehicle wheels 47 via a crankshaft 40, transmission 48, and a powertrain shaft 84 when clutches 53 are engaged. Transmission 48 may be a gearbox, a planetary gear system, or another type of transmission. Transmission 48 may be a fixed ratio transmission that includes a plurality of gear ratios to allow engine 10 to rotate at a different speed than wheels 47. By changing a torque transfer capacity of first clutch 53 (e.g., an amount of clutch slippage), an amount of engine torque relayed to the wheels via powertrain shaft 84 may be modulated.

Electric machine 52 may be an HEV motor coupled in the drivetrain between the engine and the transmission. In still other examples, electric machine 52 may be a crankshaft integrated starter/generator (CISG). The CISG may be coupled to an output shaft of the engine so that during a startup of the hybrid vehicle system, the CISG may provide torque to turn the engine to facilitate startup of the engine. Under some conditions, the CISG may supply torque output to supplement or replace engine torque. Further, the CISG may supply negative torque output (that is, absorb driveline torque) that may be converted into electric energy, such as for charging a system battery.

The powertrain may be configured in various manners, including as a parallel, a series, or a series-parallel hybrid vehicle. In electric vehicle embodiments, a system electrical energy device, such as system battery 45 may be coupled to the driveline. System battery 45a may be a traction battery that delivers electrical power to electric machine 52 to provide torque to vehicle wheels 47. In some embodiments, electric machine 52 may also be operated as a generator to provide electrical power to charge system battery 45, for example, during a braking operation. It will be appreciated that in other embodiments, including non-electric vehicle embodiments, system battery 45 may be a typical starting, lighting, ignition (SLI) battery coupled to an alternator 46. It will be appreciated that while the system electrical energy storage device 45 is depicted herein as a battery, in other examples, the electrical energy storage device 45 may be a capacitor.

Alternator 46 may be configured to charge system battery 45 using engine torque drawn from the crankshaft during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands. As elaborated herein, during conditions when the alternator is degraded, battery charging may be enabled via one or more of electric machine 52 and electric assist motor 108. In the depicted embodiment, engine 10 is a boosted engine configured with turbocharger 15. Turbocharger 15 includes compressor 114 that is mechanically coupled to, and driven by, turbine 116 via a shaft 19, the turbine 116 driven by expanding engine exhaust. In one embodiment, the turbocharger may be a twin scroll device. In another embodiment, the turbocharger may be a variable geometry turbocharger (VGT), wherein turbine geometry is actively varied as a function of engine operating conditions.

Turbocharger 15 may be further configured as an electric turbocharger having an electric motor 108 (herein also referred to as an electric assist motor or electric boost assist motor) configured to provide electric assistance to the compressor, turbine, or turbocharger shaft. In the depicted example the electric motor 108 is coupled to shaft 19 although in other examples, the electric motor may be selectively coupled to the compressor 114 or the turbine 116. Electric motor 108 may be powered by an on-board energy storage device, such as system battery 45b. In some examples, system battery 45a and 45b are a single battery. Electric motor 108 may be additionally or alternatively powered by alternator 46.

Electric motor 108 may be configured as a motor-generator. Thus, during conditions when electric assistance is required for boost build-up, the electric motor may provide positive torque to drive the centrifugal compressor of the turbocharger shaft, to improve the transient boost pressure delivery. However, the electric motor is also capable of energy recuperation by "braking" the motor shaft. Therein, negative torque may be applied to the compressor (or shaft), reducing the compressor speed and concurrently charging the system battery (such as battery 45) coupled to the motor.

An amount of electrical power delivered to electric motor 108 may be varied in order to adjust the output of the turbocharger. In one example, the amount of electric power delivered to electric motor 108 may be increased to provide positive torque to shaft 19 to increase the speed of compressor 114. As a result of the electrical assistance, compressor 114 of turbocharger 15 may be rapidly spun up, reducing turbo lag. In another example, an amount of electric power may be generated by electric motor 108 acting as a generator to provide negative torque to shaft 19 to decrease the speed of compressor 114. As a result of the regenerative action, turbine 116 may be rapidly spun down, reducing overboost.

Fresh air is introduced along intake passage 42 into engine 10 via air box 112 and flows to compressor 114. Air is then compressed at compressor 114 and introduced into engine 10. Air compressed by turbocharger 15 may also be recirculated from an outlet to an inlet of compressor 114 through a compressor recirculation passage 60 by adjusting an opening of a compressor recirculation valve (CRV) 62. CRV 62 may be a continuously variable valve, or possibly a variable discrete valve and increasing the opening of the CRV 62 may include actuating (or energizing) a solenoid of the valve if discrete or a motor controller such as an H-Bridge if continuous.

Compressor 114 is coupled to a throttle valve 20 through a charge-air cooler (CAC) 18 (also referred to as an intercooler herein). Air flows from compressor 114 through CAC 18 and throttle valve 20 to an intake manifold 22. CAC 18 may be an air-to-air or water-to-air heat exchanger, for example. Intake manifold pressure (e.g., a pressure of the air charge within the intake manifold) may be determined using a manifold absolute pressure (MAP) sensor 124.

Intake manifold 22 is coupled to a series of combustion chambers 30 through a series of intake valves (not shown). The combustion chambers are further coupled to an exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system. Likewise, configurations having a plurality of intake manifold sections may enable air sourced from different locations to be directed to different combustion chambers of the engine system (usually cylinder banks). Further, the intake manifold may have multiple intake throttles (such as one per bank).

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted for the desired combustion and emissions-control performance. For example, the cam timing may be adjusted via a variable cam timing system to move the intake and exhaust cams to a position that provides the optimal volumetric efficiency for the given operating conditions.

In some embodiments, the engine may also be configured for selective cylinder deactivation, wherein individual cylinder valve operation may be selectively deactivated via individual cylinder valve mechanisms (including intake and exhaust valve cams), and individual cylinder fueling may be selectively deactivated via deactivatable fuel injectors.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the depicted example, fuel is provided to each combustion chamber 30 via direct injection by a fuel injector 66 (while only one fuel injector is shown in FIG. 1, each combustion chamber includes a fuel injector coupled thereto). In other examples, fuel injector 66 may be coupled to an intake port, upstream of an intake valve, to provide fuel via port injection. Further still, fuel may be provided to the cylinder via multiple fuel injectors including multiple direct injectors, multiple port injectors, or a combination thereof. Fuel may be delivered to fuel injector 66 by a fuel system (not shown) including a fuel tank, a fuel pump, and a fuel rail. In the combustion chambers, combustion may be initiated via spark ignition and/or compression ignition.

As shown in FIG. 1, exhaust from exhaust manifold 36 is directed to turbine 116 to drive the turbine. When reduced turbine torque is desired, a portion of exhaust may be directed instead through a waste-gate 90, bypassing the turbine. A waste-gate actuator (e.g., waste-gate valve 92) may be actuated open to relieve at least some exhaust pressure from upstream of turbine 116 to a location downstream of turbine 116 via waste-gate 90. By reducing exhaust pressure upstream of turbine 116, turbine speed may be reduced.

In one example, the position of the waste-gate valve may be controlled in a feedback loop as a function of boost pressure (or throttle inlet pressure, TIP). In addition, the adjustments to the waste-gate valve may be coordinated with adjustments to the output of the electric boost assist motor 108. An example waste-gate control loop is shown and described at FIG. 6.

Figure 2:
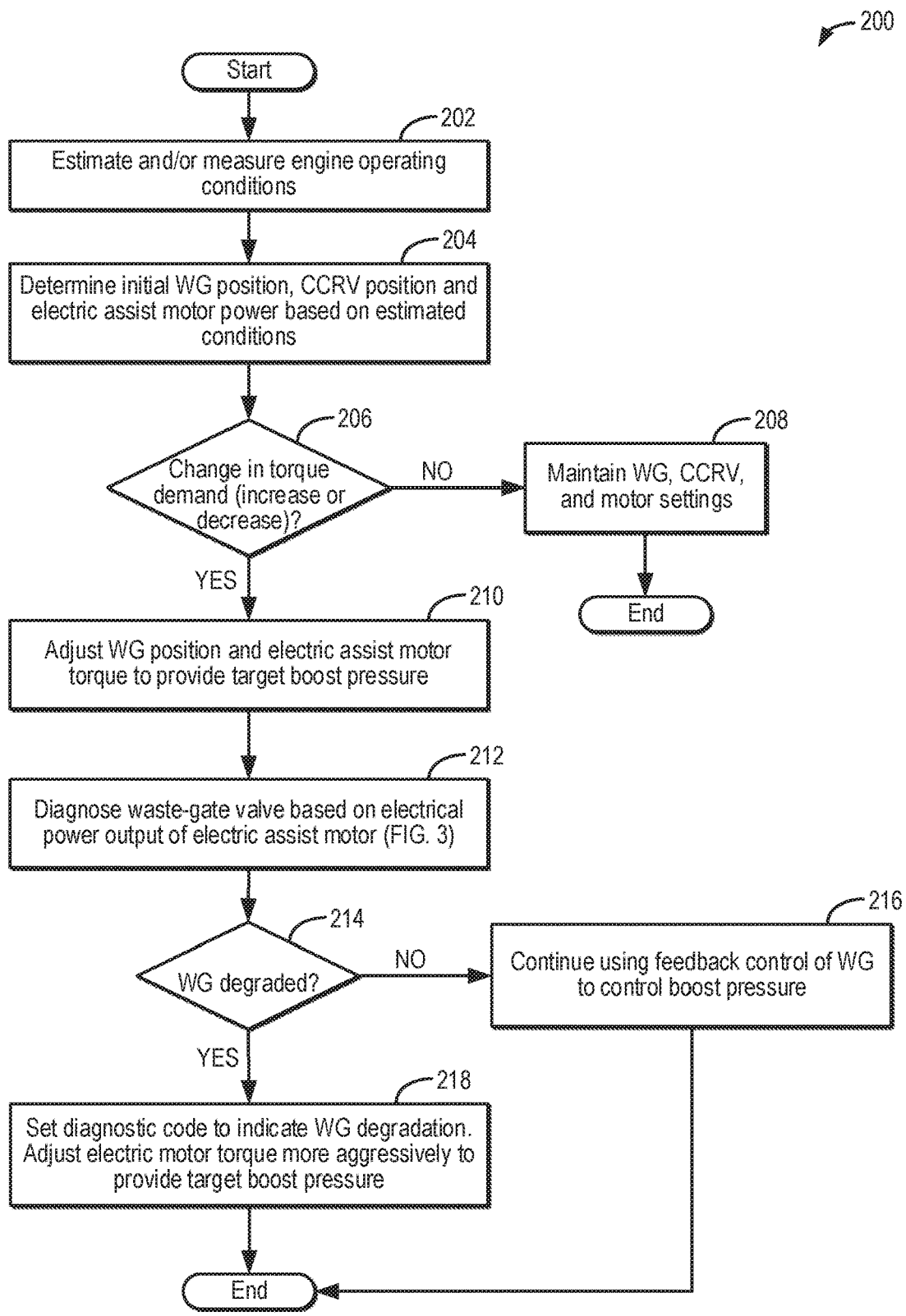
FIG. 2 depicts a high-level flow chart of a method for operating the boosted engine system of FIG. 1.

As elaborated with reference to FIG. 2, during selected conditions, the power profile of electric motor 108 may be used to diagnose waste-gate valve 92. For example, during a condition when a drop in turbine speed is required, the waste-gate valve 92 may be commanded open so that exhaust can bypass the turbine. If the electric motor 108 continues to generate power through a regenerative process, by decelerating shaft 19, so as to reduce turbine speed, then it may be inferred that the waste-gate valve is stuck closed when commanded open. As another example, during a condition when a rise in turbine speed is required, the waste-gate valve 92 may be commanded closed so that more exhaust can flow through the turbine. If the electric motor 108 continues to deliver power to accelerate shaft 19, so as to increase turbine speed, then it may be inferred that the waste-gate valve is stuck open when commanded closed. Example diagnostics routines and electric motor power profiles are shown at FIGS. 3-5.

The combined flow from turbine 116 and waste-gate 90 flows through an emission control device 170. In general, emission control device 170 may include one or more exhaust after-treatment components configured to reduce an amount of one or more substances in the exhaust flow. For example, one exhaust after-treatment component may be configured to trap NOx from the exhaust flow when the exhaust flow is lean and to reduce the trapped NOx when the exhaust flow is rich. In other examples, an exhaust after-treatment component may be configured to disproportionate NOx or to selectively reduce NOx with the aid of a reducing agent. In still other examples, emission control device 170 includes a three-way catalyst configured to oxidize residual hydrocarbons and carbon monoxide while reducing NOx in the exhaust flow. Different exhaust after-treatment catalysts having any such functionality may be arranged in wash coats or elsewhere in emission control device 170, either separately or together. In some embodiments, the emission control device 170 may further include a regeneratable soot filter configured to trap and oxidize soot particles in the exhaust flow.

All or part of the treated exhaust from emission control device 170 may be released into the atmosphere via an exhaust conduit 35. Depending on operating conditions, however, some exhaust may be diverted instead to intake passage 42 via an exhaust gas recirculation (EGR) passage (not shown), including an EGR cooler and an EGR valve. EGR may be recirculated to the inlet of compressor 114. EGR may recirculated to the intake manifold nominally with EGR flow enabled only when the intake manifold pressure is less than the exhaust manifold pressure. At high load conditions, when the engine operates boosted and with a higher manifold pressure, EGR flow may be disabled. As such, it is not efficient to flow EGR in high load conditions.

One or more sensors may be coupled to the inlet of compressor 114. For example, a temperature sensor 55 may be coupled to the inlet of compressor 114 for estimating a compressor inlet temperature. As another example, a pressure sensor 56 may be coupled to the inlet of compressor 114 for estimating a pressure of air entering the compressor. Still other sensors may include, for example, air-fuel ratio sensors, humidity sensors, etc. In other examples, one or more of the compressor inlet conditions (such as humidity, temperature, etc.) may be inferred based on engine operating conditions. The sensors may estimate a condition of the intake air received at the compressor inlet from the intake passage as well as the air charge recirculated from upstream of CAC 18. One or more sensors may also be coupled to intake passage 42 upstream of compressor 114 for determining a composition and condition of air charge entering the compressor. These sensors may include, for example, a barometric pressure sensor 58. In addition, a throttle inlet pressure (TIP) sensor 59 may be coupled downstream of CAC 18 and upstream of throttle valve 20 for estimating a boost pressure delivered to the engine, as measured by TIP sensor 59.

During an operator tip-in event, when going from engine operation without boost to engine operation with boost responsive to an increase in operator torque demand, turbo lag can occur. This is due to delays in turbine 116 spin-up due to the turbocharger being a slower-acting compression device. The same may also occur when the engine is operating boosted and there is a transient increase in boost demand due to an increase in accelerator pedal application by the vehicle operator. To improve turbine spin-up, during those selected conditions, waste-gate valve 92 may be actuated to a more closed position (e.g., to a fully closed position). In addition, turbocharger 15 may be electrically assisted by receiving positive torque from electric motor 108. Therein, the electric motor may add torque to the turbocharger shaft connecting the turbine to the compressor by drawing power from battery 45*b*.

During an operator tip-out event, when going from engine operation with boost to engine operation without boost (or reduced boost), compressor surge may occur. This is due to a decreased flow through the compressor 114 when throttle valve 20 closes at the tip-out. The reduced forward flow through the compressor can cause surge and degrade turbocharger performance. In addition, surge can lead to noise, vibration, and harshness (NVH) issues such as undesirable noise from the engine intake system. To enable the torque demand to be rapidly reduced responsive to the tip-out without incurring compressor surge during a default mode of vehicle operation, at least a portion of the air charge compressed by compressor 114 may be recirculated to the compressor inlet. This increases compressor flow rate to move operation away from the surge region. In particular, CRV 62 may be opened to recirculate (warm) compressed air from the outlet of compressor 114, upstream of CAC 18, to the inlet of compressor 114. In some embodiments, the compressor recirculation system may additionally or alternatively include a recirculation passage for recirculating cooled compressed air from downstream of CAC 18 to the inlet of compressor 114. In addition, waste-gate actuator 92 may be moved to a more open (e.g., fully open) position so that more of the exhaust flow travels to the tailpipe while bypassing the turbine, thereby expediting turbine spin-down. Further still, turbocharger 15 may be electrically assisted by receiving negative torque from electric motor 108. Therein, the electric motor may remove torque from the turbocharger shaft connecting the turbine to the compressor, while charging battery 45*b*.

Controller 12 may be included in a control system 14. Controller 12 is shown receiving information from a plurality of sensors 16 (various examples of which are described herein) and sending control signals to a plurality of actuators 81 (various examples of which are described herein). As one example, sensors 16 may include an exhaust gas sensor 126 (which may be a temperature or pressure sensor) located upstream of turbine 116, MAP sensor 124, an exhaust temperature sensor 128, an exhaust pressure sensor 129, compressor inlet temperature sensor 55, compressor inlet pressure sensor 56 (e.g., for measuring Pi), a mass air flow (MAF) sensor 57, barometric pressure sensor 58 and TIP sensor 59. Other sensors, such as additional pressure, temperature, air/fuel ratio, and composition sensors, may be coupled to various locations in vehicle system 100. The actuators 81 may include, for example, throttle valve 20, CRV 62, electric motor 108, waste-gate valve 92, and fuel injector 66. Controller 12 may receive input data from the various sensors, process the input data, and employ the various actuators to adjust engine operation based on the received signals and instructions stored on a memory of the controller. The controller may employ the actuators in response to the processed input data based on instruction or code programmed therein corresponding to one or more routines, such as example control routines described herein with regard to FIGS. 2-3. As an example, responsive to a tip-in, the controller may command the waste-gate valve 92 closed, and responsive to a tip-out, the controller may command the waste-gate valve 92 open.

FIG. 6 shows an example feedback control loop 600 for commanding waste-gate adjustments. A desired boost pressure (PB des) is determined based on operating conditions including torque demand as inferred from an operator pedal position. The desired boost pressure is the target boost pressure to be achieved via the waste-gate valve and electric motor adjustments. An actual boost pressure is determined via a sensor, such as a TIP sensor. The actual and the desired boost pressure values are received and compared at a controller (such as comparator E) to determine a boost pressure error. The error corresponds to the difference between the actual boost pressure and the desired boost pressure. The difference increases when the actual boost pressure drops below the target (such as when the operator tips in) or when the actual boost pressure rises above the target (such as when the operator tips out). The error is then fed to a proportional integral derivative (PID) controller which applies a correction based on the error. Specifically, the PID controller generates an output command for the waste-gate valve (wg cmnd), the command determined as a function of the error and a first gain value (K1) for the waste-gate valve. The command alters a position of the waste-gate valve, thereby changing the amount of exhaust directed through the exhaust turbine of the turbocharger. The PID controller also generates an output command for the electric boost assist motor (EM) (em cmnd), the command determined as a function of the error and a second gain value (K2) for the electric motor, the second gain value distinct from the first gain value K1 of the waste-gate valve. The waste-gate valve command alters a position of the waste-gate valve, thereby changing the amount of exhaust directed through the exhaust turbine of the turbocharger. The electric motor command alters an output speed of the electric motor, thereby changing the amount of torque added to a turbocharger shaft via the motor.

As elaborated herein, the gain values K1 and K2 may also be adjusted based on the state of the waste-gate relative to the state of the electric motor (and/or the state of charge of a battery coupled to the motor). Further, the gain values may be adjusted to account for the differences in response time of the electric motor (substantially immediate response) relative to the waste-gate valve (slower response).

In particular, when the waste-gate valve is not degraded, the battery SOC is higher than a threshold, and the electric motor is not degraded, the gain values K1 and K2 may be set such that the electric motor can provide boost assist to reduce the error while concurrently the waste-gate valve moves to a position from where the target boost pressure can be maintained. For example, responsive to an operator tip-in, the desired boost pressure may increase, generating an error which causes the waste-gate to be commanded to a position that is more closed, the degree of closure of the waste-gate (that is, how far it is moved from the current position towards a fully closed position) increased as the error value increases. While the waste-gate moves to the more closed position and the turbine spins up to increase the boost pressure, in the interim, the electric motor output may be increased to reduce the error.

If the battery SOC is low and the electric motor cannot be relied on to reduce the error, then the gain value K1 of the waste-gate valve may be increased so that waste-gate adjustments are used more aggressively to reduce the boost error. This may result in the waste-gate valve being moved closer to the fully closed position for a given error value during the tip-in as compared to when the battery SOC is higher.

Likewise, if the waste-gate valve is degraded, such as when the valve is stuck open, the waste-gate valve cannot be relied on to reduce the error. In this case, the gain value K2 of the electric motor may be increased so that boost assist motor adjustments are used more aggressively to reduce the boost error. This may result in the motor output being higher for a given error value during the tip-in as compared to when the waste-gate valve is not degraded.

Turning now to FIG. 2, an example method 200 is shown for operating the boosted engine system of FIG. 1. The method enables waste-gate valve diagnostics to be performed by leveraging existing components and sensors. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the method includes estimating and/or measuring engine operating conditions. These include, for example, operator torque demand, engine speed, a battery state of charge (SOC), ambient conditions such as ambient temperature, pressure, and humidity, MAF, MAP, etc.

At 204, the method includes determining an initial position for each of a waste-gate valve coupled to a waste-gate passage across an exhaust turbine, and a compressor recirculation valve (such as a continuously variable compressor recirculation valve, CCRV) coupled to an intake passage across an intake compressor. In addition, a power to be output by an electric assist motor coupled to the turbocharger (e.g., to the turbocharger shaft) may be determined. The determinations may be based on the estimated current operating conditions. As one example, as the operator torque demand increases, the desired boost pressure may increase. Accordingly, the controller may send a signal to move the waste-gate valve to a more closed position so that a larger portion of exhaust may flow through the turbine, spinning up the turbine. In addition, the controller may send a signal to move the CCRV to a more closed position so that flow recirculation is reduced and boost pressure increased. In addition, the waste-gate and CCRV adjustments may be coordinated with electric motor output adjustments to provide the desired boost pressure. Since the electric motor can provide power to the shaft independent of the turbine and the compressor, the coordinated torque from the electric motor and the turbine on the turbocharger shaft can spin the compressor at a speed required to provide the requested boost pressure. For example, if the boost pressure required to meet the torque demand is lower than a threshold, the controller may provide the desired boost pressure via adjustments to the waste-gate and CCRV only while providing no electric assist from the electric motor coupled to the turbocharger shaft. In another example, if the boost pressure required to meet the torque demand is higher than the threshold, the controller may provide the desired boost pressure via adjustments to the waste-gate and CCRV and while also providing electric assistance from the electric motor coupled to the turbocharger shaft. The threshold may be a non-zero positive threshold. Providing electric assistance from the electric motor may include the controller sending a control signal, such as a duty cycle signal, to the electric motor to spin the motor at a speed that provides an electric power corresponding to the requested electric assistance to the turbocharger shaft. This action may subsequently reduce state of charge of a battery powering the electric motor. The controller may refer to a look-up table, algorithm, or model which uses the desired boost pressure as an input and that provides a corresponding waste-gate valve position, CCRV position, and electric motor power as output. The controller may then command a signal to the corresponding actuators based on the determined valve positions and motor power.

Next, at 206, it may be determined if there is a change in operator torque demand. This may include an increase in torque demand due to a pedal tip-in event, or a decrease in torque demand due to a pedal tip-out event. In one example, a tip-in event may be confirmed if the operator torque demand increases by more than a threshold amount, increases at more than a threshold rate, responsive to accelerator pedal depression, and/or brake pedal release. Likewise, a tip-out event may be confirmed if the operator torque demand decreases by more than the threshold amount, decreases at more than the threshold rate, responsive to accelerator pedal release and/or brake pedal depression. In each case, the threshold is a non-zero threshold. If a change in torque demand is not confirmed, at 208, the method includes maintaining the settings for the waste-gate valve, the CCRV, and the electric motor.

If a change in torque demand is confirmed, then at 210, the method includes adjusting at least one or more of the waste-gate valve position and the electric boost assist motor torque (that is, torque from the electric motor coupled to the turbocharger compressor or shaft) to provide the target boost pressure. For example, responsive to an increase in torque demand, the controller may command the waste-gate valve to a more closed position, such as a fully closed position. For example, as discussed with reference to the control loop of FIG. 6, a position of the waste-gate valve may be adjusted in a feedback loop based on an error between the actual boost pressure and the target boost pressure, and further based on a gain value. Closing of the waste-gate valve may not provide the desired increase in turbine speed in the desired time frame due to the slower response time and delay involved in waste-gate valve dynamics. Therefore to allow for a quicker compressor response than via the turbine alone, the controller may additionally operate the electric motor coupled to the turbocharger shaft or compressor to provide positive torque to the turbocharger shaft to meet the boost demand. The output of the electric motor may also be adjusted in a feedback loop based on the boost error and further based on another gain value, as described with reference to the control loop of FIG. 6. In one example, such as when the boost error is higher than a threshold amount, the controller may fully close the waste-gate valve, and provide boost assist from the electric motor while the turbine spins up to a target speed corresponding to the target boost pressure. The controller may then remove the boost assist from the electric motor once the turbine speed has increased to the desired speed.

As another example, responsive to a decrease in torque demand, the controller may command the waste-gate valve to a more open position, such as a fully open position. Opening of the waste-gate valve may not provide the desired decrease in turbine speed in the desired time frame, which would result in slower than desired a decrease in boost pressure. Therefore, the controller may additionally operate the electric motor as a generator to apply negative torque on the turbocharger shaft to meet the boost demand. In one example, the controller may fully open the waste-gate valve, and regenerate energy via the electric motor/generator while the turbine spins down to a target speed corresponding to the target boost pressure. The controller may then remove the regenerative torque once the turbine speed has decreased to the desired speed.

At 212, the method includes diagnosing the waste-gate valve based on an electrical power output of the electric assist motor during the tip-in or tip-out event. As elaborated at FIG. 3, and depicted at the example profiles of FIGS. 4-5, the controller may compare an expected motor torque profile to an actual motor torque profile while commanding a change in waste-gate valve position. Based on the difference, the controller may be able to infer if the waste-gate valve is degraded, and further, which position the waste-gate valve is stuck in. For example, if continued boost assist is required to spin up a turbine after commanding a waste-gate valve closed on a pedal tip-in event, then it may be inferred that the waste-gate valve is stuck open. As another example, if regenerative energy is continually generated to spin down a turbine after commanding a waste-gate valve open on a pedal tip-out event, then it may be inferred that the waste-gate valve is stuck closed.

At 214, it is determined if waste-gate valve degradation is confirmed. If not, then at 216, the method includes continuing to use waste-gate adjustments to control boost pressure. In particular, the controller continues to feedback control a position of the waste-gate valve based on a measured error between sensed boost pressure and target boost pressure, and further based on a default gain value. In addition, the electric boost assist motor also continues to be used for boost pressure control with the motor output feedback controlled as a function of the measured error and another default gain value.

Else, at 218, if waste-gate valve degradation is confirmed, the method includes setting a diagnostic code to indicate waste-gate valve degradation. In response to the indication of waste-gate valve degradation, the controller may adjust electric motor torque more aggressively to provide the target boost pressure. This includes controlling an output of the electric motor based on the measured boost error while increasing the gain value of the motor command so that a larger portion of the boost error is accounted for via the electric motor in view of the degraded waste-gate valve. For example, more positive motor torque than would otherwise be required may be provided during a tip-in. As a result, the controller would apply more control effort to the waste-gate valve position command and the turbocharger electrical machine torque. As another example, responsive to an indication of waste-gate valve degradation, the controller may enter an FMEM state and boost usage may be discontinued.

Turning now to FIG. 3, a method 300 is shown for diagnosing a waste-gate valve based on changes in electric motor torque during a transient. Method 300 may be performed as part of the method of FIG. 2, such as at 212.

At 302, the method includes confirming a tip-in event. If a tip-in event is confirmed, then at 304, the method includes commanding the waste-gate valve closed. In one example, a degree of closure (and a final position) of the waste-gate valve that is commanded is based on the requested increase in torque demand at the tip-in.

As an example, the waste-gate valve may be commanded closed only if boost is required as a result of a larger tip-in where the target throttle inlet pressure is higher than a threshold. Depending on operating conditions, for a smaller tip-in, where the target throttle inlet pressure is lower than the threshold, it may be sufficient to just open the throttle more if there is still vacuum in the intake manifold.

At 306, a positive motor torque profile of the electric motor during the tip-in is compared to an actual positive motor torque profile. Various aspects of the positive motor torque profile may be assessed. For example, it may be determined if the positive motor torque profile includes a first duration of increasing (positive) motor torque followed immediately by a second duration of decreasing (positive) motor torque. Further, a slope of the increasing motor torque of the first duration may be compared to a threshold and a slope of decreasing motor torque of the second duration may be compared to another threshold. As another example, the first duration over which the positive torque initially increases may be compared to a threshold, and a second duration over which the positive torque subsequently decreases may be compared to another threshold. Further still, a rate of change of the torque at different durations since the tip-in may be assessed.

In one example, as described with reference to FIG. 4, the expected positive motor torque profile may include positive torque increasing for a first duration since the tip-in, and then decreasing for a second duration following the first duration. Thereafter, a short burst of positive motor torque (or negative motor torque) may be provided intermittently, after the second duration has elapsed. If the positive motor torque profile is as expected, then at 308, it may be indicated that the waste-gate valve is not degraded. Else, if the positive motor torque profile is different from the expected profile, then at 310, it may be indicated that the waste-gate valve is degraded, specifically, stuck open.

When a higher turbine speed and boost pressure is demanded, the waste-gate valve is commanded closed and the electric motor is operated to assist to reach the desired turbine speed. Once that speed is reached, the electric assist is removed and a combination of the exhaust flow, the waste-gate valve position, and intermittent regeneration energy is used by the controller to maintain the turbine speed. Positive electric energy is not needed at this point on assuming proper turbocharger sizing.

If the waste-gate valve is stuck open, however, the desired turbine speed will be higher than the current speed and the waste-gate valve will be commanded closed to send more flow to the turbine. The electric motor will initially assist the turbocharger to reach the desired turbine speed, but will continue to provide power as the exhaust flow is being diverted around the turbine due to the stuck waste-gate valve. A higher power being required to maintain the set-point to what is expected will indicate that the waste-gate valve is faulted open. A time based diagnostic can also be implemented to compare the time the motor provides power after the set-point is reached to a calibratable fault time value. If there is no transient request to increase turbine speed, the electric motor should not be providing power to keep the turbine at the targeted speed. Thus, responsive to the positive motor torque increasing at a faster rate over the first duration, and/or continuing to increase over the second duration (where it was expected to decrease), it may be inferred that the waste-gate valve is stuck open.

It will be appreciated that the waste-gate valve being stuck open can also be diagnosed on a tip-out where regeneration is desired. If the regenerated power or the time spent regenerating is less than what is expected, it may be indicated that the waste-gate valve is open more than commanded. An example profile is shown at FIG. 4.

If a tip-in event is not confirmed at 302, then at 312, the method includes confirming a tip-out event. If a tip-out event is confirmed, then at 314, the method includes commanding the waste-gate valve open. In one example, a degree of opening (and a final position) of the waste-gate valve that is commanded is based on the requested decrease in torque demand at the tip-out.

At 316, a negative motor torque profile of the electric motor during the tip-out is compared to an actual negative motor torque profile. Various aspects of the negative (regenerative) motor torque profile may be assessed. For example, it may be determined if the negative motor torque profile includes a first duration of increasing (negative) motor torque followed immediately by a second duration of decreasing (negative) motor torque. Further, a slope of the increasing regenerative torque of the first duration may be compared to a threshold and a slope of decreasing regenerative torque of the second duration may be compared to another threshold. As another example, the first duration over which the regenerative torque initially increases may be compared to a threshold, and a second duration over which the regenerative torque subsequently decreases may be compared to another threshold. Further still, a rate of change of the torque at different durations since the tip-out may be assessed.

In one example, as described with reference to FIG. 5, the expected regenerative motor torque profile may include regenerative torque increasing for a first duration since the tip-out, and then decreasing for a second duration following the first duration. Thereafter, a short burst of positive motor torque (or negative motor torque) may be provided intermittently, after the second duration has elapsed.

If the negative motor torque profile is as expected, then at 318, it may be indicated that the waste-gate valve is not degraded. Else, if the negative motor torque profile is different from the expected profile, then at 320, it may be indicated that the waste-gate valve is degraded, specifically, stuck closed.

Commanding the waste-gate valve open is generally done to prevent the turbocharger turbine from over-speeding under high loads or to reduce turbine speed and boost pressure during a tip-out. This scenario can be diagnosed by looking at the electrical energy to reach the desired turbocharger speed. In the over-speed scenario, the electrical energy should be minimal as the waste-gate valve is expected to bleed exhaust flow and the turbine speed should decrease. The same analysis can be done in the tip-out scenario. In this scenario, the controller may maintain the waste-gate valve closed and attempt to recuperate energy via the turbocharger electric machine, depending on the operating condition. As driver demand decreases, the desired turbine speed will decrease and an opened waste-gate valve will slow the turbocharger speed down. In the tip out scenario regeneration will occur and energy will be regained as the speed decreases to its target. However, if the waste-gate valve is stuck closed when commanded open, the electric regeneration energy will begin to increase to maintain the targeted turbine speed. Instead of exhaust flow diverting around the turbine, the high energy flow will continue to spin the turbine and accelerate it. Therefore, regeneration must continue to occur to safely keep the turbine at the speed target. Comparing this energy to what would be expected during normal waste-gate valve functionality will enable diagnosis of a waste-gate stuck closed. In the tip-out scenario, the turbine speed may decrease at a much slower rate than if the waste-gate was successfully opened. In this scenario, the electric motor will go into regeneration mode (with the motor acting as a generator to apply negative torque on the turbine shaft and charge a system battery) to reach the lower target speed in the desired time. Thus, responsive to the regenerative motor torque increasing at a faster rate over the first duration, and/or continuing to increase over the second duration (where it was expected to decrease), it may be inferred that the waste-gate valve is stuck closed. By comparing the regenerated energy to what would be expected under normal circumstances, a waste-gate valve stuck closed condition can be diagnosed. An example profile is shown at FIG. 5.

Turning now to FIG. 4, map 400 depicts an example scenario of diagnosing a waste-gate valve during a tip-in event. Map 400 depicts an operator torque request at plot 402. A waste-gate valve (WG) opening command is shown at plots 404 (when not degraded) and plot 405 (dashed line, when stuck open). An electric assist motor power is shown at plot 406 (when the WG is not degraded) and plot 407 (when WG is stuck open). Boost pressure is shown at plot 408 (when WG is not degraded) and plot 409 (when WG is stuck open). A battery state of charge (SOC) is shown at plot 410 (when WG is not degraded) and plot 411 (when WG is stuck open). Electric assist motor power may include depiction of positive motor torque provided to the turbine shaft by drawing charge from a system battery and operating the boost assist motor in a motoring mode where torque is added to the shaft. Electric assist motor power may further include depiction of negative motor torque provided to the turbine shaft by supplying charge to a system battery and operating the boost assist motor in a generating mode where torque is removed from the shaft. All plots are shown over time along the x-axis.

Prior to t1, the engine is operating boosted and at steady-state. A waste-gate is partially open and the desired boost pressure is met via waste-gate adjustments alone. At this time, no electric assist is required as indicated by the zero torque provided by the boost assist motor. The battery SOC is elevated as no power is being drawn.

At t1, responsive to an operator tip-in event, boost demand increases. To increase the boost output of the turbocharger, the waste-gate valve is commanded closed. If the waste-gate is not degraded, then the closing of the WG will result in the boost pressure starting to increase between t1 and t2 (plot 408). While the turbine speed increases between t1 and t2, positive electric boost assist may be transiently provided and then discontinued after t2 (plot 406). This results in a drop in SOC between t1 and t2 (plot 410). Thereafter, turbine speed control and boost pressure control may be provided by intermittently operating the electric motor as a generator and using regenerative electrical energy for boost control, as shown at t3, t4, and t5 (plot 406). This results in corresponding spikes in battery SOC (plot 410).

However, if the WG is stuck open (plot 405), then even after commanding the WG closed and providing the transient electric boost assist, the boost pressure may not reach the target level (plot 409). Consequently, the controller may continue to provide positive electric boost assist, and increase the amount of positive boost assist from t1 onwards (plot 407). As a result, the battery SOC also continues to correspondingly drop (plot 411).

Turning now to FIG. 5, map 500 depicts an example scenario of diagnosing a waste-gate valve during a tip-out event. Map 500 depicts an operator torque request at plot 502. A waste-gate valve (WG) opening command is shown at plots 504 (when not degraded) and plot 505 (dashed line, when stuck closed). An electric assist motor power is shown at plot 506 (when the WG is not degraded) and plot 507 (when WG is stuck closed). Boost pressure is shown at plot 508 (when WG is not degraded) and plot 509 (when WG is stuck closed). A battery state of charge (SOC) is shown at plot 510 (when WG is not degraded) and plot 511 (when WG is stuck closed). Electric assist motor power may include depiction of positive motor torque provided to the turbine shaft by drawing charge from a system battery and operating the boost assist motor in a motoring mode where torque is added to the shaft. Electric assist motor power may further include depiction of negative motor torque provided to the turbine shaft by supplying charge to a system battery and operating the boost assist motor in a generating mode where torque is removed from the shaft. All plots are shown over time along the x-axis.

Prior to t1, the engine is operating boosted and at steady-state. A waste-gate is partially open and the desired boost pressure is met via waste-gate adjustments alone. At this time, no electric assist is required as indicated by the zero torque provided by the boost assist motor. The battery SOC is maintained as no power is being drawn.

At t1, responsive to an operator tip-out event, boost demand decreases. To decrease the boost output of the turbocharger, the waste-gate valve is commanded open. If the waste-gate is not degraded, then the opening of the WG will result in the boost pressure starting to decrease between t1 and t2 (plot 508). While the turbine speed increases between t1 and t2, negative electric torque may be transiently applied in the shaft and then discontinued after t2 (plot 506). This results in a rise in SOC between t1 and t2 (plot 510). Thereafter, turbine speed control and boost pressure control may be provided by the waste-gate alone.

However, if the WG is stuck closed (plot 505), then even after commanding the WG open and providing the transient regenerative energy from the electric motor/generator, the boost pressure may not reach the target level (plot 509) and over-speeding may occur. Consequently, the controller may continue to apply negative torque on the turbine shaft, and increase the amount of regenerative energy from t1 onwards (plot 507). As a result, the battery SOC also continues to correspondingly rise (plot 511).

It will be appreciated that analyzing battery SOC is one way to diagnose the waste-gate valve. However, since electric turbochargers have accurate voltage and current measurements or estimations, these may also be used to compute a power and energy usage of the turbocharger. Such estimates may be more accurate and reliable for determining an electrical energy profile for the turbocharger relative to the battery SOC.

In this way, an electrical power profile of an electric assist motor of an electric turbocharger may be used to diagnose an exhaust waste-gate valve. The technical effect of monitoring a rate and duration of change in positive torque applied by the motor on a turbocharger shaft during a tip-in is that prolonged positive assist may be used to infer that the waste-gate valve is stuck open. Likewise, monitoring a rate and duration of change in negative torque applied by the motor on a turbocharger shaft during a tip-out is that prolonged regeneration may be used to infer that the waste-gate valve is stuck closed. By leveraging existing hardware for waste-gate valve diagnostics, the need for dedicated sensors is reduced without compromising the reliability and accuracy of the diagnostic.

One example method for an engine coupled to a turbocharger comprises: during a torque transient, commanding a change in exhaust waste-gate valve position; and indicating degradation of the waste-gate valve based on a change in electrical energy input or output by an electric boost assist motor coupled to the turbocharger. In the preceding example, additionally or optionally, the method further comprises monitoring the change in electrical energy input or output by the electric boost assist motor for a duration after commanding the change in waste-gate valve position. In any or all of the preceding examples, additionally or optionally, the method further comprises monitoring an actual boost pressure relative to a target boost pressure based on the torque transient. In any or all of the preceding examples, additionally or optionally, the torque transient includes one of a pedal tip-in and a pedal tip-out. In any or all of the preceding examples, additionally or optionally, when the torque transient is an increase in torque, the commanded change includes commanding the waste-gate valve closed, and when the torque transient is a decrease in torque, the commanded change includes commanding the waste-gate valve open. In any or all of the preceding examples, additionally or optionally, the indicating includes indicating that the waste-gate valve is stuck open responsive to continued and/or increasing electrical energy output by the motor over the duration after commanding the waste-gate valve closed. In any or all of the preceding examples, additionally or optionally, the indicating includes indicating that the waste-gate valve is stuck closed responsive to continued and/or increasing electrical energy input into the motor over the duration after commanding the waste-gate valve open. In any or all of the preceding examples, additionally or optionally, the duration is a duration until a target boost pressure for the torque transient is reached. In any or all of the preceding examples, additionally or optionally, the method further comprises responsive to the indicating that the waste-gate valve is stuck open, increasing a gain value of a boost pressure feedback response of the electric motor; and responsive to the indicating that the waste-gate valve is stuck closed, temporarily disabling boost usage.

Another example method for a turbocharged engine, comprises: responsive to a pedal transient, commanding a change in waste-gate valve position; monitoring a torque profile of an electric boost assist motor coupled to a turbocharger following the commanding; and indicating degradation of the waste-gate valve based on the monitored torque profile relative to an expected torque profile. In any or all of the preceding examples, additionally or optionally, the pedal transient is a pedal tip-in, the commanded change includes commanding the waste-gate valve to a more closed position, and when the pedal transient is a pedal tip-out, the commanded change includes commanding the waste-gate valve to a more open position. In any or all of the preceding examples, additionally or optionally, a target turbine speed is based on the pedal transient, and when the pedal transient is the pedal tip-in, the expected torque profile includes a transient increase in positive motor torque applied on a turbocharger shaft via the electric boost assist motor until a target turbine speed is reached, followed by intermittent bursts of negative motor torque applied on the turbocharger shaft via the electric boost assist motor to maintain the target turbine speed. In any or all of the preceding examples, additionally or optionally, when the pedal transient is the pedal tip-out, the expected torque profile includes a transient increase in negative motor torque applied on the turbocharger shaft via the electric boost assist motor until the target turbine speed is reached, followed by intermittent bursts of positive motor torque applied on the turbocharger shaft via the electric boost assist motor to maintain the target turbine speed. In any or all of the preceding examples, additionally or optionally, the indicating includes: when the pedal transient is the pedal tip-in, indicating that the waste-gate valve is stuck open responsive to the monitored torque profile including a prolonged and gradual increase in the positive motor torque applied on the turbocharger shaft; and when the pedal transient is the pedal tip-out, indicating that the waste-gate valve is stuck closed responsive to the monitored torque profile including a prolonged and gradual increase in the negative motor torque applied on the turbocharger shaft. In any or all of the preceding examples, additionally or optionally, the method further comprises responsive to the indicating that the waste-gate valve is stuck open, operating the electric boost assist motor with a higher gain function; and responsive to the indicating that the waste-gate valve is stuck closed, temporarily disabling boost usage. In any or all of the preceding examples, additionally or optionally, monitoring the torque profile of an electric boost assist motor includes monitoring a change in state of charge of a battery coupled to the electric boost assist motor.

Another example boosted engine system comprises: an engine; a turbocharger having an intake compressor coupled to an exhaust turbine via a shaft; an electric motor/generator coupled to the shaft; a battery coupled to the electric motor/generator; a waste-gate passage including a waste-gate valve bypassing the exhaust turbine; and a controller with computer-readable instructions stored on non-transitory memory that when executed cause the controller to: command a change in position of the waste-gate valve; monitor a change in battery state of charge after commanding the change and until a target boost pressure is reached; and diagnose the waste-gate valve based on the monitored change in battery state of charge. In any or all of the preceding examples, additionally or optionally, the controller includes instructions to command the waste-gate valve to a more open position in response to a decrease in operator torque demand, a degree of opening of the waste-gate valve increased as the operator torque demand decreases from a current level; and command the waste-gate valve to a more closed position in response to an increase in operator torque demand, a degree of closing of the waste-gate valve increased as the operator torque demand increases from the current level. In any or all of the preceding examples, additionally or optionally, the controller includes instructions to indicate that the waste-gate valve is stuck closed when commanded to the more open position responsive to higher than expected rise in battery state of charge; and responsive to the indication, disabling boost usage. In any or all of the preceding examples, additionally or optionally, the controller includes instructions to: indicate that the waste-gate valve is stuck open when commanded to the more closed position responsive to higher than expected drop in battery state of charge; and responsive to the indication, disabling boost usage.

In a further representation, the engine system is coupled in a hybrid vehicle system. In another further representation, a method for a boosted engine comprises: indicating degradation of a waste-gate valve coupled to an exhaust turbine of a turbocharger based on a voltage or current response of an electric boost assist motor coupled to the turbocharger, the voltage or current response sensed following a commanded change in boost pressure. In the preceding example, additionally or optionally, the commanded change in boost pressure includes a commanded increase in boost pressure responsive to an increase in operator torque demand, or a decrease in boost pressure responsive to a decrease in the operator torque demand. In any or all of the preceding examples, additionally or optionally, the indicating degradation is based on the voltage or current response following the commanded change in boost pressure being higher than expected or longer than expected. In any or all of the preceding examples, additionally or optionally, the method further comprises commanding each of a change in waste-gate valve position and a change in motor output responsive to a boost error between sensed boost pressure and the commanded boost pressure, the commanded boost pressure based on driver torque demand, and responsive to the indication of waste-gate valve degradation, commanding the change in motor output with a higher than default gain function. In any or all of the preceding examples, additionally or optionally, commanding the change in motor output with a higher than default gain function includes providing a larger motor output for a given boost error relative to a default output for the given boost error. In any or all of the preceding examples, additionally or optionally, responsive to the indication of waste-gate valve degradation, temporarily disabling boost pressure usage.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine coupled to a turbocharger, comprising:
during a torque transient,
commanding, with a signal output by a controller, a change in exhaust waste-gate valve position;
indicating, with the controller, degradation of the waste-gate valve based on a change in electrical energy input or output by an electric boost assist motor coupled to the turbocharger; and
setting, with the controller, a diagnostic code in response to indicating degradation of the waste-gate valve.

2. The method of claim 1, further comprising monitoring, with the controller, the change in electrical energy input or output by the electric boost assist motor for a duration after commanding the change in waste-gate valve position.

3. The method of claim 2, further comprising monitoring, with the controller, an actual boost pressure relative to a target boost pressure based on the torque transient.

4. The method of claim 2, wherein the torque transient includes one of a pedal tip-in and a pedal tip-out.

5. The method of claim 2, wherein when the torque transient is an increase in torque, the commanded change includes commanding the waste-gate valve closed, and when the torque transient is a decrease in torque, the commanded change includes commanding the waste-gate valve open.

6. The method of claim 5, wherein the indicating includes:
indicating that the waste-gate valve is stuck open responsive to continued and/or increasing electrical energy output by the motor over the duration after commanding the waste-gate valve closed.

7. The method of claim 6, wherein the indicating includes:
indicating that the waste-gate valve is stuck closed responsive to continued and/or increasing electrical energy input into the motor over the duration after commanding the waste-gate valve open.

8. The method of claim 7, wherein the duration is a duration until a target boost pressure for the torque transient is reached.

9. The method of claim 7, further comprising:
responsive to the indicating that the waste-gate valve is stuck open, increasing, with the controller, a gain value of a boost pressure feedback response of the electric boost assist motor and/or temporarily disabling boost usage.

10. A method for a turbocharged engine, comprising:
responsive to a pedal transient, commanding, with a signal output from a controller, a change in waste-gate valve position;
monitoring, with the controller, a torque profile of an electric boost assist motor coupled to a turbocharger following the commanding;
indicating, with the controller, degradation of the waste-gate valve based on the monitored torque profile relative to an expected torque profile; and
setting, with the controller, a diagnostic code in response to indicating degradation of the waste-gate valve.

11. The method of claim 10, wherein when the pedal transient is a pedal tip-in, the commanded change includes commanding the waste-gate valve to a more closed position, and when the pedal transient is a pedal tip-out, the commanded change includes commanding the waste-gate valve to a more open position.

12. The method of claim 11, wherein a target turbine speed is based on the pedal transient, and when the pedal transient is the pedal tip-in, the expected torque profile includes a transient increase in positive motor torque applied on a turbocharger shaft via the electric boost assist motor until a target turbine speed is reached, followed by intermittent bursts of negative motor torque applied on the turbocharger shaft via the electric boost assist motor to maintain the target turbine speed.

13. The method of claim 12, wherein when the pedal transient is the pedal tip-out, the expected torque profile includes a transient increase in negative motor torque applied on the turbocharger shaft via the electric boost assist motor until the target turbine speed is reached, followed by intermittent bursts of positive motor torque applied on the turbocharger shaft via the electric boost assist motor to maintain the target turbine speed.

14. The method of claim 12, wherein the indicating includes:
when the pedal transient is the pedal tip-in, indicating that the waste-gate valve is stuck open responsive to the monitored torque profile including a prolonged and gradual increase in the positive motor torque applied on the turbocharger shaft; and
when the pedal transient is the pedal tip-out, indicating that the waste-gate valve is stuck closed responsive to the monitored torque profile including a prolonged and gradual increase in the negative motor torque applied on the turbocharger shaft.

15. The method of claim 14, further comprising:
responsive to the indicating that the waste-gate valve is stuck open, feedback operating, with the controller, the electric boost assist motor with a higher gain function and/or temporarily disabling boost usage.

16. The method of claim 10, wherein monitoring the torque profile of an electric boost assist motor includes monitoring a change in state of charge of a battery coupled to the electric boost assist motor.

17. A boosted engine system, comprising:
an engine;
a turbocharger having an intake compressor coupled to an exhaust turbine via a shaft;
an electric motor/generator coupled to the shaft;
a battery coupled to the electric motor/generator;
a waste-gate passage including a waste-gate valve bypassing the exhaust turbine; and
a controller with computer-readable instructions stored on non-transitory memory that when executed cause the controller to:
command a change in position of the waste-gate valve via a signal output from the controller;
monitor a change in battery state of charge after commanding the change and until a target boost pressure is reached;
diagnose the waste-gate valve based on the monitored change in battery state of charge; and
set a diagnostic code based on the diagnosing.

18. The system of claim 17, wherein the controller includes instructions to:
command the waste-gate valve to a more open position in response to a decrease in operator torque demand, a degree of opening of the waste-gate valve increased as the operator torque demand decreases from a current level; and
command the waste-gate valve to a more closed position in response to an increase in operator torque demand, a degree of closing of the waste-gate valve increased as the operator torque demand increases from the current level.

19. The system of claim 18, wherein the controller includes instructions to:
indicate that the waste-gate valve is stuck closed when commanded to the more open position responsive to higher than expected rise in battery state of charge; and
responsive to the indication, disable boost usage.

20. The system of claim 18, wherein the controller includes instructions to:
indicate that the waste-gate valve is stuck open when commanded to the more closed position responsive to higher than expected drop in battery state of charge; and
responsive to the indication, disable the boost usage.

* * * * *